US010663077B2

(12) United States Patent
Birkelund

(10) Patent No.: US 10,663,077 B2
(45) Date of Patent: May 26, 2020

(54) SOLENOID VALVE

(71) Applicant: Danfoss A/S, Nordborg (DK)

(72) Inventor: Michael Birkelund, Middelfart (DK)

(73) Assignee: Danfoss A/S, Nordborg (DK)

( * ) Notice: Subject to any disclaimer, the term of this patent is extended or adjusted under 35 U.S.C. 154(b) by 198 days.

(21) Appl. No.: 15/303,335

(22) PCT Filed: May 28, 2015

(86) PCT No.: PCT/EP2015/061832
§ 371 (c)(1),
(2) Date: Oct. 11, 2016

(87) PCT Pub. No.: WO2015/185437
PCT Pub. Date: Dec. 10, 2015

(65) Prior Publication Data
US 2017/0167633 A1 Jun. 15, 2017

(30) Foreign Application Priority Data
Jun. 4, 2014 (EP) .................................... 14171133

(51) Int. Cl.
*F16K 31/06* (2006.01)
*F16K 47/08* (2006.01)
(Continued)

(52) U.S. Cl.
CPC ...... *F16K 31/0665* (2013.01); *F16K 31/0655* (2013.01); *F16K 31/0675* (2013.01);
(Continued)

(58) Field of Classification Search
CPC ............. F16K 31/0655; F16K 31/0665; F16K 31/0675; F16K 39/024; F16K 47/023; F16K 47/16; F16K 47/08; Y10T 137/7765
(Continued)

(56) References Cited

U.S. PATENT DOCUMENTS 2,990,155 A    6/1961   Selinder
3,593,957 A *   7/1971   Dolter ................... F16K 31/404
                                                           251/30.03
(Continued)

FOREIGN PATENT DOCUMENTS

CN           1869483 A    11/2006
CN       100453864 C     1/2009
(Continued)

OTHER PUBLICATIONS

International Search Report for PCT Serial No. PCT/EP2015/061832 dated Aug. 4, 2015.
(Continued)

*Primary Examiner* — William M McCalister
(74) *Attorney, Agent, or Firm* — McCormick, Paulding & Huber PLLC

(57) ABSTRACT

A solenoid valve (1) is described comprising a first port (2), a second port (3), a valve element (4) and a valve seat (5) arranged between said first port (2) and said second port (3), a coil (12) and a yoke arrangement (14-16), said coil (12) being magnetically linked to said yoke arrangement (14-16), said yoke arrangement (14-16) having a movable armature (16). In such a solenoid valve the generation of noise should be kept low. To this end said valve element (4) is driven by a pressure difference between a first pressure on a first side (6) of said valve element (4) and a second pressure on a second side (7) of said valve element (4), at least one of said first pressure and said second pressure being controlled by means of said armature (16), wherein said armature (16) comprises a first front face (18) at a first end and a second front face (19) at a second end opposite said first end, said first front face (18) and said second front face (19) being connected by a first flow path (21), said first flow path (Continued)

having first throttling means for keeping low a flow of a fluid flowing through said first flow path (21).

20 Claims, 3 Drawing Sheets

(51) Int. Cl.
*F16K 39/02* (2006.01)
*F16K 47/02* (2006.01)

(52) U.S. Cl.
CPC ............ *F16K 39/024* (2013.01); *F16K 47/08* (2013.01); *Y10T 137/7765* (2015.04)

(58) Field of Classification Search
USPC .......................................................... 137/490
See application file for complete search history.

(56) References Cited

U.S. PATENT DOCUMENTS

| | | | |
|---|---|---|---|
| 5,370,354 A * | 12/1994 | Kunz | F16K 31/0658 251/129.15 |
| 5,460,349 A | 10/1995 | Campbell et al. | |
| 5,573,224 A * | 11/1996 | Kim | F16K 31/404 251/230 |
| 5,599,003 A * | 2/1997 | Seemann | H01F 7/124 251/129.2 |
| 5,735,582 A | 4/1998 | Eith et al. | |
| 5,848,613 A | 12/1998 | Sakaguchi et al. | |
| 6,076,550 A * | 6/2000 | Hiraishi | F16K 31/0655 137/550 |
| 6,293,513 B1 | 9/2001 | Birkelund | |
| 6,364,430 B1 | 4/2002 | Park | |
| 6,783,110 B2 | 8/2004 | Hirota et al. | |
| 7,111,822 B2 | 9/2006 | Dornhoefer et al. | |
| 9,217,511 B2 * | 12/2015 | Williams | F16K 31/0606 |
| 2005/0001183 A1 * | 1/2005 | Hironaka | B60T 8/363 251/50 |
| 2005/0087714 A1 | 4/2005 | Dornhoefer et al. | |
| 2013/0105715 A1 | 5/2013 | Kim et al. | |
| 2013/0207016 A1 * | 8/2013 | Schubitschew | B60T 8/363 251/129.15 |
| 2013/0306891 A1 | 11/2013 | Fietz et al. | |
| 2014/0264113 A1 * | 9/2014 | Grover | F16K 31/0655 251/129.15 |
| 2015/0028237 A1 * | 1/2015 | Liu | F16K 39/024 251/129.2 |

FOREIGN PATENT DOCUMENTS

| | | |
|---|---|---|
| CN | 103052547 A | 4/2013 |
| CN | 103185164 A | 7/2013 |
| CN | 203604779 U | 5/2014 |
| CN | 203703316 U | 7/2014 |
| CN | 105156735 A | 12/2015 |
| DE | 1168725 B | 4/1964 |
| DE | 19632262 A1 | 2/1997 |
| DE | 19954617 A1 | 5/2000 |
| DE | 10345946 A1 | 4/2005 |
| DE | 202005013233 U1 | 10/2005 |
| DE | 102010003958 A1 | 10/2011 |
| DE | 102010038900 A1 | 2/2012 |
| DE | 102012021715 A1 | 5/2013 |
| EP | 0481184 A1 | 4/1992 |
| EP | 1316750 A1 | 6/2003 |
| EP | 3152471 A1 | 4/2017 |
| JP | 64003177 U1 | 10/1989 |
| JP | H09508338 A | 8/1997 |
| JP | 2007092825 A | 4/2007 |
| JP | 4872868 B2 | 2/2012 |
| JP | 2013524130 A | 6/2013 |
| JP | 2013137094 A | 7/2013 |
| JP | 2014035006 A | 2/2014 |
| JP | 5891841 B2 | 3/2016 |
| WO | 2010090606 A1 | 8/2010 |
| WO | 2015185437 A1 | 12/2015 |

OTHER PUBLICATIONS

Japanese Notice of the Reason for Refusal and English Translation for Serial No. 2016-563130 dated Jan. 15, 2019.

* cited by examiner

SOLENOID VALVE

CROSS REFERENCE TO RELATED APPLICATION

This application is entitled to the benefit of and incorporates by reference subject matter disclosed in the International Patent Application No. PCT/EP2015/061832 filed on May 28, 2015 and European Patent Application No. 14171133.3 filed on Jun. 4, 2014.

TECHNICAL FIELD

The invention relates to a solenoid valve comprising a first port, a second port, a valve element and a valve seat arranged between said first port and said second port, a coil and a yoke arrangement, said coil being magnetically linked to said yoke arrangement, said yoke arrangement having a moveable armature.

BACKGROUND

Such a solenoid valve is known, for example, from U.S. Pat. No. 5,460,349 A or U.S. Pat. No. 6,783,110 B2 or DE 20 2005 013 233 U1.

Such a solenoid valve can, for example, be used as expansion valve in a cooling or air conditioning system. However, other applications are possible.

The valve element and the valve seat together form a variable flow resistance for a fluid flowing from one port to the other port. The position of the valve element relative to the valve seat is controlled by the yoke arrangement and the coil. When the coil is supplied with a current, the position of the moveable armature is changed.

Such a solenoid valve often shows a certain noise when actuated. Such noise can be in the form of "clicks" and in the form of a "water hammer".

SUMMARY

The object underlying the present invention is to keep noise low.

This object is solved in a solenoid valve described at the beginning in that said valve element is controlled by a pressure difference between a first pressure on a first side of said valve element and a second pressure on a second side of said valve element, at least one of said first pressure and said second pressure being controlled by means of said armature, wherein said armature comprises a first front face at a first end and a second front face at a second end opposite said first end, said first front face and said second front face being connected by a first flow path, said first flow path having first throttling means for keeping a flow rate low of a fluid flowing through said first flow path.

When the armature is moved, a volume of a chamber at the first front face of the armature is increased or decreased. Therefore, a certain volume of fluid has to be moved into or out of this chamber. This fluid is moved through the first flow path. The throttling means forms a resistance against this movement so that the flow of the fluid can be kept small. Since the armature controls the pressure only and the armature moves with a low velocity only, the valve element will move with a similar low velocity. The smaller the velocity the lower is the noise. Since the valve element is pressure controlled, a velocity of the movement of the valve element can generally be kept smaller than with actuation by magnetic forces. This reduces a "click" noise when the valve element or the armature is stopped in their end positions. In this valve the armature controls the movement of the valve element. Since the armature moves slowly, the movement of the valve element is slow as well. Therefore, noise produced by a so called water hammer can be reduced as well.

Preferably a second flow path connects said first side and said second side of said valve element, said second flow path having second throttling means for keeping a low flow rate of a fluid flowing through said second flow path. When the valve element is moved under control of a pressure difference over the valve element, a certain amount of fluid has to flow through the second flow path. When this movement of the fluid through the second flow path is restricted so that the flow rate is kept small, this has the consequence that the movement of the valve element itself is slow as well. The slower movement of the valve element reduces the noise.

Preferably said first flow path is arranged between said armature and a wall of a housing surrounding said armature and/or said second flow path is arranged between said valve element and a wall of the housing surrounding said valve element. In a preferred embodiment said valve element and said armature are arranged within a tubular housing one behind the other. The first flow path and/or the second flow path do not need a bore, channel, duct or the like in the armature element or in the valve. The first flow path and/or the second flow path can easily be formed between the housing and the armature element or the valve, respectively.

In a preferred embodiment a housing is formed as a tube having the same diameter for said armature and said valve element. Such a tube is simple to produce.

In a preferred embodiment said first throttling means and/or said second throttling means comprise a surface structure in a wall of said flow path. This is a simple way to form a restriction for the fluid passing through the flow path. The surface structure causes turbulences in the flow thereby reducing the average speed of the flow through the flow path. The surface structure increases the flow resistance without the necessity to use small tolerances which would increase production costs.

In a particular preferred embodiment said surface structure is a saw tooth like profile. Such a saw tooth like profile forms many small restrictions between the armature and the wall of the housing and/or between the valve element and the wall of the housing.

Preferably said tooth like profile comprises grooves running circumferentially or screw like around said valve element. This is a simple way to form said saw tooth like profile.

Preferably said valve element comprises a through going channel, a pilot valve being arranged at an end of said channel facing said armature, said armature acting on said pilot valve. When the armature moves towards the valve element and acts on the pilot valve in closing direction the pressure on the first side of the valve element increases and moves the valve element in a direction towards the valve seat. When the armature moves away from the valve element and acts on the pilot valve in opening direction, the pressure at the first side of the valve element decreases and the pressure at the second side of the valve element moves the valve element away from the valve seat. In other words, the armature has to control the pilot valve only and does not have to move the valve element directly. The valve element follows the movement of the armature. A distance between the valve element and the armature will remain almost constant.

Preferably said pilot valve comprises a pilot valve element, said armature holding said pilot valve element. Even if the pilot valve is open and the pilot valve element is lifted off the opening of the channel at the first side of the valve element, the pilot valve element is held by the armature. In a preferred example the armature comprises a ring shaped wall in which the pilot valve element is accommodated.

In a preferred embodiment said valve element comprises a throttling cone at an end near said valve seat, said cone being insertable into an opening surrounded by said valve seat. Such a cone allows for a gradual opening of the valve.

Preferably said valve has a stroke corresponding to at least 50%, preferably at least 75% of an inner diameter of said valve seat. This stroke is rather large. Usually the stroke corresponds to approximately 25% of the inner diameter of the valve seat. A larger stroke has the consequence that the valve element needs more time for travelling from a first end position to a second end position. This is a further possibility to keep the noise produced by the solenoid valve small.

In a preferred embodiment said valve element and/or said armature are provided with a closure member made of a pressure resistance plastic material, in particular PTFE. When such a closure member contacts its counterpart, for example a corresponding valve seat, there is basically no contact noise. Polytetrafluoroethylene (PTFE) avoids sticking of the closure member to its counterpart.

Preferably said valve element is provided with stroke limiting means. This is a further feature to avoid or at least reduce the generation of noise. The stroke limiting means prevent that the valve element contacts the moveable armature when the valve element has reached the fully open position. In particular in connection with a closure member of plastic material there is a further advantage: that wear of the closure member can be reduced or in an optimum case avoided.

Preferably said stroke limiting means are in form of a shoulder cooperating with a housing part. Such a shoulder is basically an increased diameter of the valve element which can run completely around the valve element in circumferential direction or which can be interrupted. Such a shoulder can come into contact with a housing part, for example the above mentioned wall of the housing surrounding the valve element when the valve element is in fully open condition.

BRIEF DESCRIPTION OF THE DRAWINGS

Preferred examples of the invention will now be described in more detail with reference to the drawing, wherein.

DETAILED DESCRIPTION

A solenoid valve 1 comprises a first port 2 and a second port 3. The two ports 2, 3 of the valve 1 can be connected, for example, to a circuit in which a refrigerant circulates. In this case, the valve 1 can be used as expansion valve.

Figure 8:
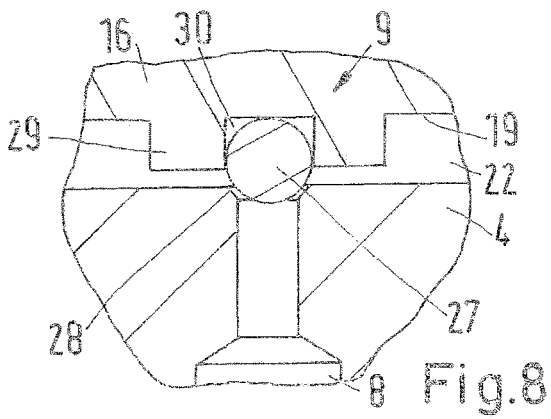
FIG. 8 shows a pilot valve in open condition.
Figure 9:
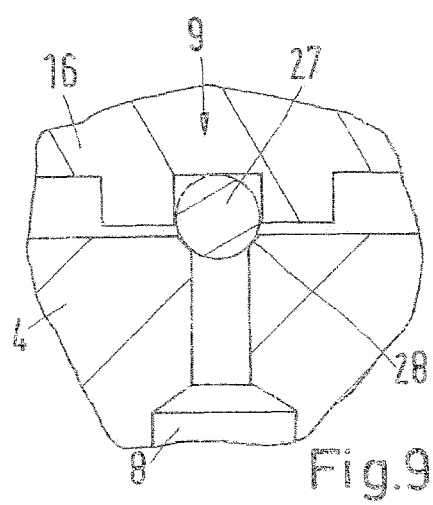
FIG. 9 shows the pilot valve in closed condition.

The valve 1 comprises a valve element 4 cooperating with a valve seat 5. The valve element 4 has a first side 6 and a second side 7. Furthermore, the valve element 4 comprises a through going channel 8 connecting the first side 6 and the second side 7. A pilot valve 9 which will be described in more detail in connection with FIGS. 8 and 9 is arranged at the end of the channel 8 at the first side 6.

The valve element 4 is arranged in a tubular housing 10. The valve element 4 is moveable in the housing 10 along a longitudinal axis 11 of the housing 10.

The housing 10 is surrounded by a coil 12 which can be supplied with electrical energy via an electrical connection 13. The coil 12 is part of a magnetic circuit. The magnetic circuit furthermore comprises a yoke arrangement having a first yoke part 14 surrounding the housing 10, a stationary second yoke part 15 positioned within the housing 10 and a moveable armature 16 arranged within housing 10 as well. A spring 17 is positioned between the second yoke part 15 and the armature 16 and forces the armature 16 away from the second yoke part 15. The housing 10 is in form of a tube having the same diameter for the valve element 4 and the armature 16.

When the coil 12 is energized with electrical current, the yoke arrangement is magnetized and the second yoke part 15 attracts magnetically the moveable armature 16 against the force of the spring 17.

The armature 16 has a first front face 18 and a second front face 19.

A first flow path 21 is arranged between the housing 10 and the armature 16. A second flow path 20 is arranged between the valve element 4 and the housing 10.

A first pressure space 22 is arranged between the valve element 4 and the armature 16. A second pressure space 23 is arranged between the armature 16 and the second yoke part 15.

Figure 4:
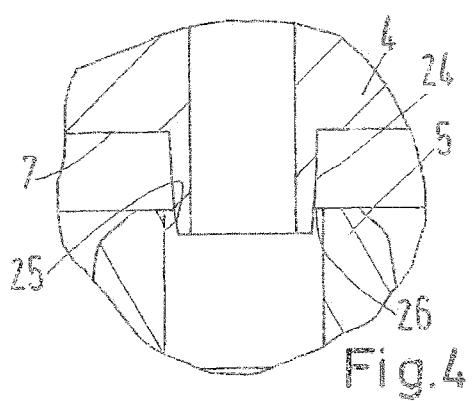
FIG. 4 shows an enlarged view of a throttling cone of the valve in a partly opened condition.
Figure 5:
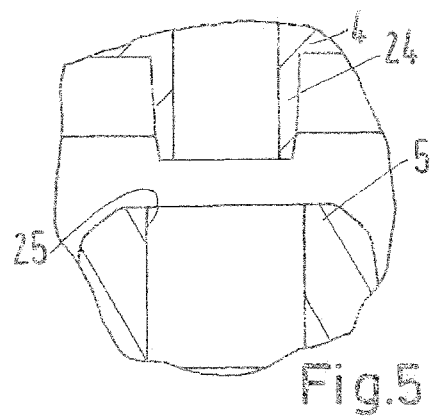
FIG. 5 shows the throttling cone in a fully open condition.

More details of the valve element 4 are shown in FIGS. 4 and 5. The valve element 4 comprises a throttling cone 24 at the second side 7, i.e. the side facing the valve seat 5. FIG. 4 shows the valve element 4 in partly open condition. In this condition the throttling cone 24 is partly inserted into an opening 25 which is surrounded by the valve seat 5.

When the throttling cone 24 is moved into the opening 25 the flow resistance through a gap 26 between the throttling cone 24 and the valve seat 25 gradually decreases.

FIGS. 8 and 9 show further details of the pilot valve 9. The pilot valve 9 comprises a pilot valve element 27 in form of a ball and a pilot valve seat 28 in form of a cone. The diameter of the pilot valve element 27 is larger than the largest diameter of the pilot valve seat 28.

The armature 16 at its second front face 19 comprises a ring shaped wall 29 surrounding a space 30 accommodating the pilot valve element 27. The ring shaped wall 29 can be replaced by at least three protrusions extending from the second front face 19 of the armature 16 in a direction towards the valve element 4.

FIG. 9 shows the pilot valve 9 in closed condition. The pilot valve element 27 is pressed against the pilot valve seat 28 by means of the armature 16.

Figure 6:
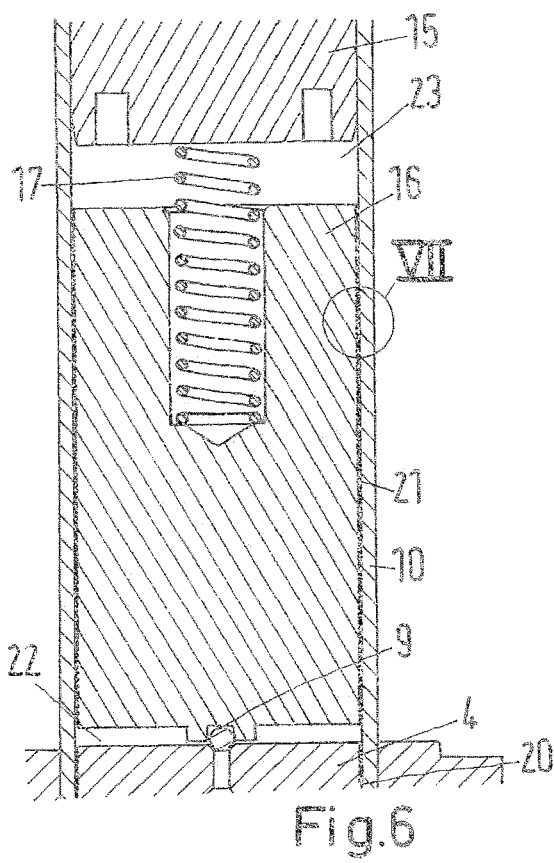
FIG. 6 shows an enlarged view of the armature.
Figure 7:
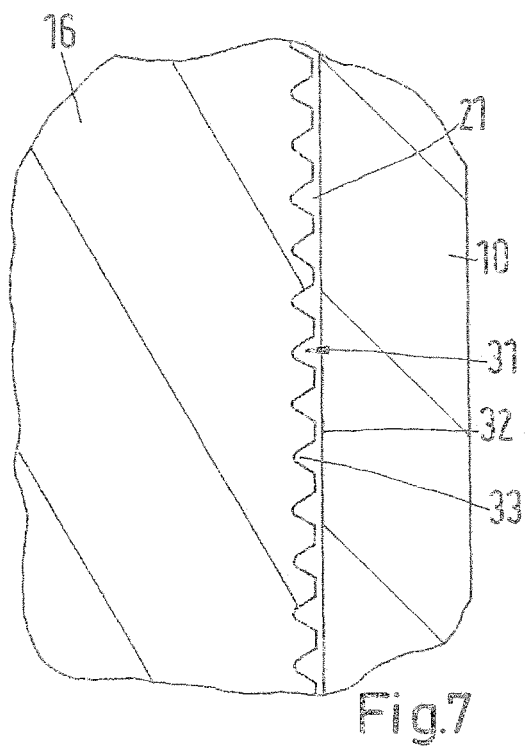
FIG. 7 shows a detail VII of FIG. 6.

FIG. 6 shows an enlarged view of the armature 16. FIG. 7 shows a detail VII of FIG. 6. It can be seen that the armature 16 has a saw tooth like profile 31 at its circumference. The saw tooth like profile 31 comprises a number of peaks 32 and valleys 33. Each peak 32 together with the housing 10 forms a restriction for a fluid passing through the second flow path 21. Furthermore, the succession of the peaks 32 and the valleys 33 causes a turbulent flow thus reducing the maximum possible velocity of the flow passing through the first flow path 21. The surface structure formed by the saw tooth like profile 31 increases the flow resistance or hydraulic resistance without the necessity to use small tolerances which would increase production costs.

The same surface structure is provided on the circumference of the valve element 4.

Figure 1:
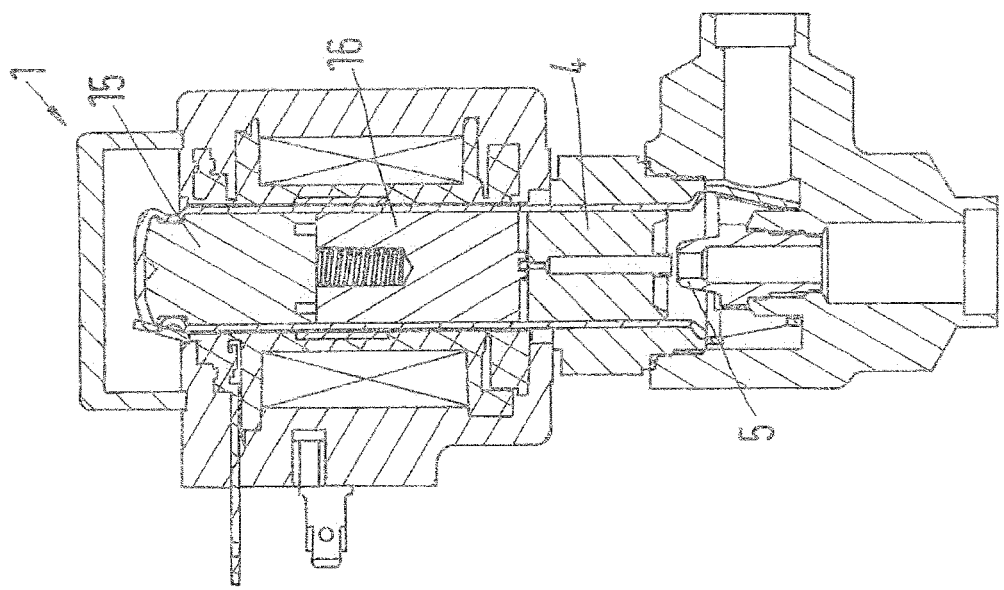
FIG. 1 shows a solenoid valve in closed condition.

In the condition shown in FIG. 1 the valve 1 is closed, i.e. a connection between the first port 1 and the second port 2 is interrupted. The valve element 4 contacts the valve seat 5 and the cone 24 is completely inserted into the opening 25.

In this condition fluid entering the valve via the first port 2 passes through the second flow path 20 and increases the pressure in the first pressure space 22 since this fluid cannot escape through the pilot valve 9. The pilot valve 9 is closed by means of the armature 16.

Although the pressure on both sides 6, 7 of the valve element 4 is the same, the valve element 4 is pressed against the valve seat 5 since the pressure in the first pressure space 22 acts on a larger area than the pressure at the second side 7 of the valve element. On the second side 7 the valve seat 5 covers a part of the pressure area and connects this to a lower pressure.

If, however, the coil 12 is energized and the armature 16 is attracted by the second part 15 of the yoke arrangement against the force of the spring 17, the armature 16 is moved a bit away from the valve element 4. In this case the pilot valve element 27 is lifted off from the pilot valve seat 28 and fluid in the first pressure space 22 can escape through the channel 8 thus decreasing the pressure in the second pressure space 22. The pressure difference between the second side 7 and the first side 6 moves the valve element 4 to follow the armature 16 until the pilot valve 9 is moved in closing direction. This movement is rather slow since the surface structure on the circumference of the valve element 4 throttles the flow through the second flow path 20. The movement of the armature 16 is slow as well since the fluid in the second pressure space 23 can escape through the first flow path 21 only which has, as described above, a certain flow resistance. The movement of the valve element 4 is controlled by the movement of the armature 16. Since the armature 16 can move with low velocity only, the velocity of the valve element is limited as well. Consequently, not only noise produced by a "click" but also noise produced by a water hammer can be reduced.

Figure 2:
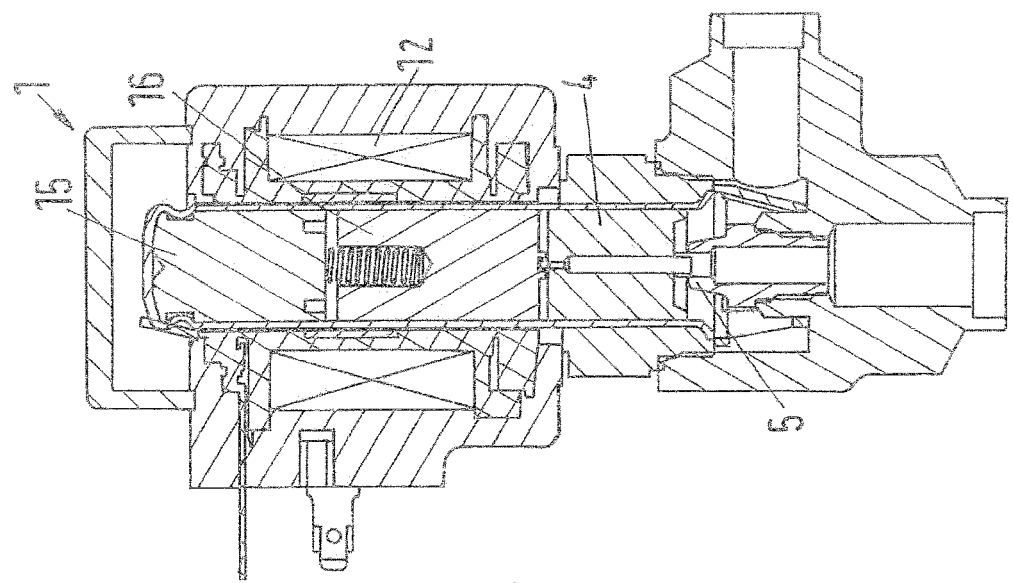
FIG. 2 shows the solenoid valve during opening.

FIG. 2 shows the valve 1 during opening or closing.

Figure 3:
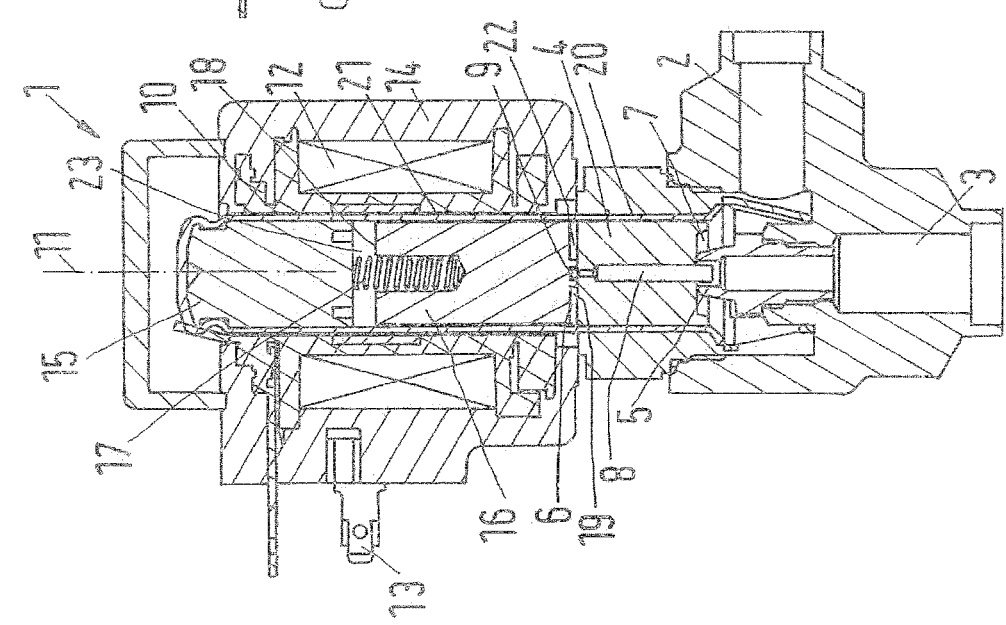
FIG. 3 shows the solenoid valve in a fully open condition.

In a fully open condition shown in FIG. 3 the armature 16 has been moved to contact the second yoke part 15. The throttling cone 24 has been completely moved out of the opening 25.

The valve element 4 has a stroke corresponding to at least 50% of the inner diameter of the valve seat 25, i.e. of the diameter of the opening 25 which can also be termed as main orifice. The stroke is the distance the valve element 4 moves between the fully closed condition shown in FIG. 1 and the fully open condition in FIG. 3. The stroke corresponds to the extension of the second pressure space 23 parallel to the axis 11 of the housing 10.

Figure 10:
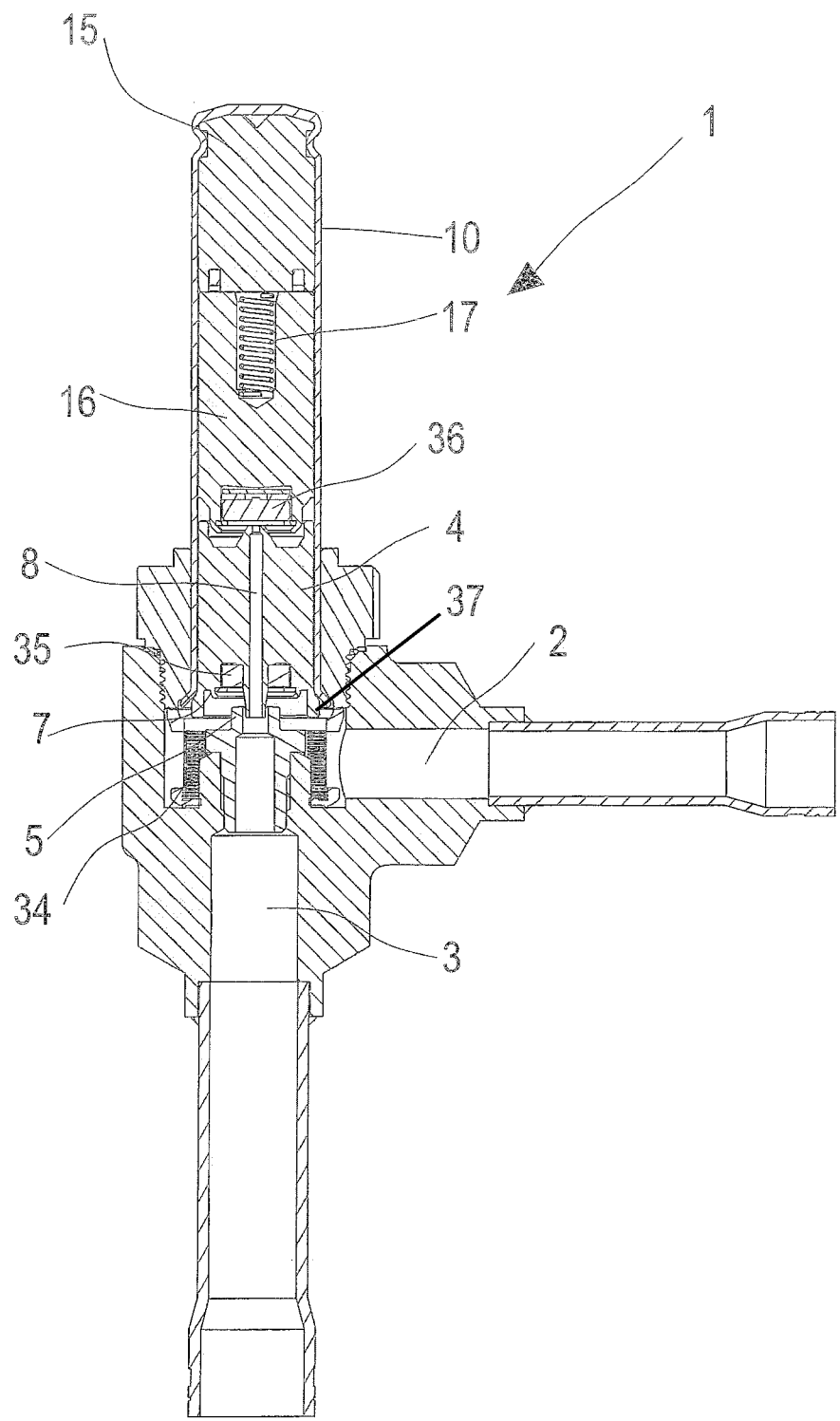
FIG. 10 shows a further embodiment of a solenoid valve in open condition.

FIG. 10 shows a further embodiment of a valve in open condition. Elements which have been described in connection with the embodiment shown in FIGS. 1 to 9 are referred to with the same reference numerals.

A strainer or mesh 34 has been added to remove dirt of other part flowing together with the refrigerant through the valve 1.

The valve element 4 is provided with a closure member 35 made of a plastic material, like polytetrafluoroethylene (PTFE) on its lower side 7. This closure member 35 comes into contact with the valve seat 5, when the valve element 4 is moved into a closing position. Furthermore, the armature 16 is provided with a closure member 36 made of a plastic material like polytetrafluoroethylene (PTFE). This closure member 36 replaces the pilot valve 9 of FIGS. 1 to 9.

Valve element 4 is provided with stroke limiting means 37 in form of a radial shoulder. When the valve element 4 is in fully open condition, like shown in FIG. 10, this stroke limiting means 37 comes in contact with the housing 10. The stroke limiting means 37 limits the stroke of the valve element 4 so that in the open condition shown in FIG. 10 the valve element 4 does not come into contact with closure member 36 of armature 16. Therefore, the damage of the closure member 36 of armature 16 can be avoided when the valve element 4 by the pressure difference is forced against the closure member 36.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A solenoid valve comprising a first port, a second port, a valve element and a valve seat arranged between said first port and said second port, a coil and a yoke arrangement, said coil being magnetically linked to said yoke arrangement, said yoke arrangement having a movable armature, wherein said valve element is controlled by a pressure difference between a first pressure on a first side of said valve element and a second pressure on a second side of said valve element, at least one of said first pressure and said second pressure being controlled by means of said armature, wherein said armature comprises a first front face at a first end and a second front face at a second end opposite said first end, said first front face and said second front face being connected by a first flow path, said first flow path having first throttling means for keeping low a flow rate of a fluid flowing through said first flow path, wherein a second flow path connects said first side and said second side of said valve element, said second flow path having second throttling means for keeping a low flow rate of a fluid flowing through said second flow path, wherein said second flow path is arranged between said valve element and a wall of a housing, said housing surrounding said valve element.

2. The solenoid valve according to claim 1, wherein said first flow path is arranged between said armature and a wall of the housing, said housing surrounding said armature.

3. The solenoid valve according to claim 2, wherein said housing is formed as tube having the same diameter for said armature and said valve element.

4. The solenoid valve according to claim 1, wherein said first throttling means and/or said second throttling means comprise a surface structure in a wall of said flow path.

5. The solenoid valve according to claim 4, wherein said surface structure is a saw tooth like profile.

6. The solenoid valve according to claim 5, wherein said saw tooth like profile comprises grooves running circumferentially or screw like around said valve element and/or said armature.

7. The solenoid valve according to claim 1, wherein said valve element comprises a through going channel, a pilot valve being arranged at an end of said channel facing said armature, said armature acting on said pilot valve.

8. The solenoid valve according to claim 7, wherein said pilot valve comprises a pilot valve element, said armature holding said pilot valve element.

9. The solenoid valve according to claim 1, wherein said valve element comprises a throttling cone at an end near said valve seat, said cone being insertable into an opening surrounded by said valve seat.

10. The solenoid valve according to claim 1, wherein said valve element has a stroke corresponding to at least 50% of an inner diameter of said valve seat.

11. The solenoid valve according to claim 1, wherein said valve element and/or said armature are provided with a closure member made of a pressure resistant plastic material.

12. The solenoid valve according to claim 1, wherein said valve element is provided with stroke limiting means.

13. The solenoid valve according to claim 12, wherein said stroke limiting means are in form of a shoulder cooperating with a housing part.

14. The solenoid valve according to claim 2, wherein said first throttling means and/or said second throttling means comprise a surface structure in a wall of said flow path.

15. The solenoid valve according to claim 3, wherein said first throttling means and/or said second throttling means comprise a surface structure in a wall of said flow path.

16. The solenoid valve according to claim 2, wherein said valve element comprises a through going channel, a pilot valve being arranged at an end of said channel facing said armature, said armature acting on said pilot valve.

17. The solenoid valve according to claim 3, wherein said valve element comprises a through going channel, a pilot valve being arranged at an end of said channel facing said armature, said armature acting on said pilot valve.

18. The solenoid valve according to claim 4, wherein said valve element comprises a through going channel, a pilot valve being arranged at an end of said channel facing said armature, said armature acting on said pilot valve.

19. The solenoid valve according to claim 1, wherein said valve element has a stroke corresponding to at least 75% of an inner diameter of said valve seat.

20. The solenoid valve according to claim 11, wherein said closure member is made of PTFE.

* * * * *